(12) United States Patent
Filipchuk

(10) Patent No.: US 12,503,296 B2
(45) Date of Patent: Dec. 23, 2025

(54) ANIMAL TREAT DISPENSER

(71) Applicant: Amanda Nicole Filipchuk, Calgary (CA)

(72) Inventor: Amanda Nicole Filipchuk, Calgary (CA)

(*) Notice: Subject to any disclaimer, the term of this patent is extended or adjusted under 35 U.S.C. 154(b) by 123 days.

(21) Appl. No.: 18/183,510

(22) Filed: Mar. 14, 2023

(65) Prior Publication Data

US 2024/0308754 A1    Sep. 19, 2024

(51) Int. Cl.
 *B65D 83/00*  (2006.01)
 *A01K 5/00*  (2006.01)

(52) U.S. Cl.
 CPC .......... *B65D 83/7713* (2025.01); *A01K 5/00* (2013.01)

(58) Field of Classification Search
 CPC ............................ B65D 83/7713; A01K 5/00
 USPC ..... 222/465.1, 210, 206–207, 556, 213, 215
 See application file for complete search history.

(56) References Cited

U.S. PATENT DOCUMENTS

| | | | | |
|---|---|---|---|---|
| 2,029,997 A * | 2/1936 | Gaddy | ................... | A47G 19/24 222/215 |
| 2,252,119 A * | 8/1941 | Edmonds | ............... | A61J 7/0053 222/215 |
| 2,626,647 A * | 1/1953 | Barton | .................... | B29C 65/18 222/215 |
| 2,743,038 A * | 4/1956 | Ferries | ............... | B65D 83/0055 222/215 |
| 2,922,425 A * | 1/1960 | Lerner | ................... | B65D 47/42 401/292 |
| 4,091,965 A * | 5/1978 | Gebhard | .............. | B65D 47/265 222/548 |
| 5,305,928 A * | 4/1994 | Verdaguer | ............ | B65D 51/246 30/125 |
| 5,421,488 A * | 6/1995 | Ehrbar | ...................... | B65D 1/32 215/2 |
| 5,556,008 A * | 9/1996 | Silver | .................... | A61J 7/0023 222/207 |
| 6,789,704 B2 * | 9/2004 | Hennessey | ........... | B65D 83/771 222/206 |
| 6,941,895 B2 * | 9/2005 | St. Pierre | ............. | A01K 5/0114 119/51.01 |
| 7,971,753 B2 * | 7/2011 | Mihashi | ............... | B65D 83/771 222/215 |

(Continued)

*Primary Examiner* — Paul R Durand
*Assistant Examiner* — Michael J. Melaragno
(74) *Attorney, Agent, or Firm* — Orin Del Vecchio

(57) ABSTRACT

An animal treat dispenser that is configured to dispense treats to an animal wherein the present invention is operable to dispense both solid and semi-solid food material for consumption by an animal. The present invention includes a handle member wherein the handle member includes an interior volume configured to receive and store food material therein. Operably coupled to the handle member is a dispensing member that is configured to receive a portion of the food material therein from the handle member and make accessible to be consumed by the animal. The present invention includes a plurality of embodiments of the dispensing member configured for solid and semi-solid food delivery. A lid is present that is operable to cover an embodiment of the dispensing member. A gate valve is present intermediate the handle member and dispensing member so as to control distribution of food material.

12 Claims, 3 Drawing Sheets

(56) References Cited

U.S. PATENT DOCUMENTS

| | | | | |
|---|---|---|---|---|
| 8,100,303 B2* | 1/2012 | Parve | ................ | B65D 47/0857 |
| | | | | 220/254.2 |
| 8,459,504 B2* | 6/2013 | Braxton | ................ | B65D 35/38 |
| | | | | 222/106 |
| 8,544,695 B2* | 10/2013 | Gordon | ................ | B65D 23/003 |
| | | | | 248/220.21 |
| 8,596,220 B2* | 12/2013 | Mainini | ................ | A01K 7/00 |
| | | | | 119/51.03 |
| 11,246,293 B2* | 2/2022 | Wolfe, Jr. | ................ | A01K 15/026 |
| 2004/0011809 A1* | 1/2004 | Yoshimoto | ................ | B65D 83/771 |
| | | | | 222/206 |
| 2005/0045115 A1* | 3/2005 | Mann | ................ | A01K 15/026 |
| | | | | 119/711 |
| 2005/0120973 A1* | 6/2005 | St. Pierre | ................ | A01K 5/0114 |
| | | | | 119/709 |
| 2005/0121465 A1* | 6/2005 | Miranda | ................ | B65D 35/36 |
| | | | | 222/206 |
| 2005/0139616 A1* | 6/2005 | Ichikawa | ................ | B65D 83/7713 |
| | | | | 222/325 |
| 2007/0228079 A1* | 10/2007 | Vogel | ................ | B65D 47/0838 |
| | | | | 222/548 |
| 2010/0187262 A1* | 7/2010 | Archeny | ................ | B65D 11/04 |
| | | | | 264/513 |
| 2011/0083608 A1* | 4/2011 | Markham | ................ | A01K 5/0114 |
| | | | | 119/51.01 |
| 2011/0204095 A1* | 8/2011 | Iwatsubo | ................ | B65D 1/32 |
| | | | | 222/206 |
| 2011/0290825 A1* | 12/2011 | Gordon | ................ | A47K 5/13 |
| | | | | 222/206 |
| 2012/0012068 A1* | 1/2012 | Costello | ................ | A01K 15/025 |
| | | | | 221/282 |
| 2012/0111894 A1* | 5/2012 | Bakhos | ................ | B67D 7/0244 |
| | | | | 222/386.5 |
| 2013/0233246 A1* | 9/2013 | Wang | ................ | A01K 15/025 |
| | | | | 119/51.01 |
| 2014/0048017 A1* | 2/2014 | Mainini | ................ | A01K 15/02 |
| | | | | 119/51.01 |
| 2014/0318462 A1* | 10/2014 | Reiss | ................ | A01K 5/0114 |
| | | | | 119/51.01 |
| 2015/0217911 A1* | 8/2015 | Wilson | ................ | A61J 11/0085 |
| | | | | 53/471 |
| 2015/0323368 A1* | 11/2015 | Thomson | ................ | B67C 11/04 |
| | | | | 222/465.1 |
| 2019/0098864 A1* | 4/2019 | Simon | ................ | A01K 15/025 |
| 2019/0269099 A1* | 9/2019 | Karras | ................ | A01K 15/025 |
| 2020/0154676 A1* | 5/2020 | Walt | ................ | B65D 83/762 |
| 2021/0204519 A1* | 7/2021 | Karras | ................ | A01K 15/026 |
| 2022/0133596 A1* | 5/2022 | Tabor | ................ | A61J 7/0061 |
| | | | | 604/514 |
| 2022/0256808 A1* | 8/2022 | Axelrod | ................ | A01K 15/026 |
| 2022/0330524 A1* | 10/2022 | Mattos | ................ | A01K 15/026 |
| 2024/0147964 A1* | 5/2024 | Tanoury | ................ | A01K 5/0114 |
| 2024/0308754 A1* | 9/2024 | Filipchuk | ................ | B65D 83/7713 |

* cited by examiner

ANIMAL TREAT DISPENSER

FIELD OF THE INVENTION

The present invention relates generally to edible product dispensers, more specifically but not by way of limitation, a dispenser configured to provide delivery of an edible treat for an animal wherein the dispenser is configured to delivery a plurality of types of food media to animals.

BACKGROUND

Millions of people own dogs and other animals as household pets. Proper training of pets like dogs goes a long way into having a successful relationship with the dog as well as providing a good environment for a dog. Training a dog can be difficult and positive rewards are considered to be one of the best methods to be implemented in training. Treats help an individual get the desired behavior from the dog and then let the dog know that it performed the behavior correctly. Dogs tend to learn faster and have more fun when they get rewarded for good behavior. Utilizing treats establishes a behavior pattern that will instill in the dog a proper behavior. Administration of treats during training has been shown in studies to keep the dog engaged and further drive future participation in the training protocol.

One way dog treats are used is to lure dogs to do the behavior you want. For example, when a dog is trained to sit, an individual can start by luring a dog with a treat. Most dogs instinctively react to the smell of the treat and will naturally perform certain body movements in order to investigate the treat. By way of example, if a treat is held slightly above the head of the dog, the dog will naturally lift its head up which will cause the rear of the dog to move slightly downward. Positioning a treat like this has been shown to work well in luring a dog to sit. Luring works well on a number of other behaviors. Dog treats are also a great way to reward a dog to recognize it has done something right. If an individual has lured a dog into a sit, providing a treat when the dog's rear end hits the floor will provide a positive reinforcement. This tactic works for all behaviors wherein an individual provides a treat immediately so the dog associates the action with the reward. One issue with treat delivery is that there are different types of food media and treat sizes/shapes that are undesirable during consistent providing of treats during a training protocol.

Accordingly, there is a need for a treat dispensing device that is configured to provide dispensing of treats for an animal being trained wherein the dispenser is configured to dispense alternate types of food media.

SUMMARY OF THE INVENTION

It is the object of the present invention to provide an animal treat dispenser configured to receive store and dispense alternate types of treat media wherein the present invention includes a handle.

Another object of the present invention is to provide a dog treat dispenser configured to dispense treats for dogs wherein the handle is hollow and configured to store treats therein.

A further object of the present invention is to provide an animal treat dispenser configured to receive store and dispense alternate types of treat media wherein the body of the present invention includes a plurality of alternate dispensing members.

Yet a further object of the present invention is to provide a dog treat dispenser configured to dispense treats for dogs wherein the dispensing members are configured to dispense treat materials that are solid and semi-solid.

Still another object of the present invention is to provide an animal treat dispenser configured to receive store and dispense alternate types of treat media wherein an embodiment of the dispensing member can include a hingedly secured lid.

An additional object of the present invention is to provide a dog treat dispenser configured to dispense treats for dogs wherein a gate valve can be present between the cavity of the handle and the dispensing member.

Yet a further object of the present invention is to provide an animal treat dispenser configured to receive, store and dispense alternate types of treat media wherein one embodiment of the dispensing member includes pouch member having a plurality of apertures formed therein.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
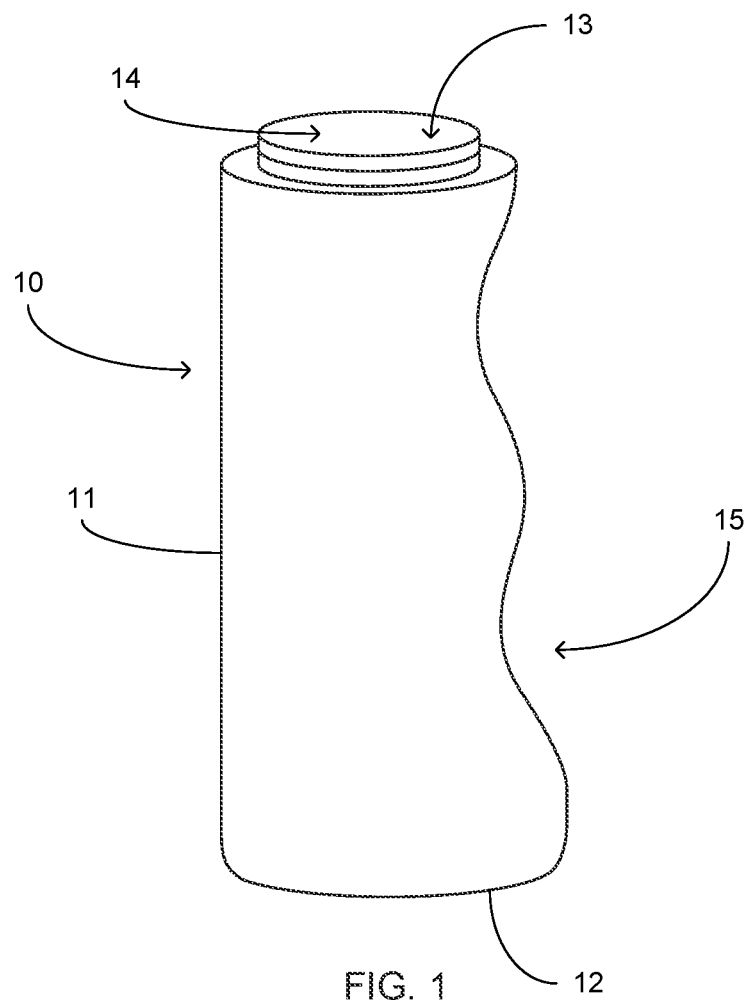
FIG. 1 is a side view of an embodiment of the handle of the present invention.

Referring now to the drawings submitted herewith, wherein various elements depicted therein are not necessarily drawn to scale and wherein through the views and figures like elements are referenced with identical reference numerals, there is illustrated an animal treat dispenser 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the animal treat dispenser 100 includes a handle member 10 illustrated herein in FIG. 1. The handle member 10 is manufactured from a pliable material such as but not limited to silicone or plastic. Handle member 10 includes wall 11 and bottom 12 contiguously formed to create an interior volume 13 being access by opening 14. The handle member 10 is manufactured from a material that is squeezable by a human hand wherein pressure on the handle member 10 will egress a material disposed within the interior volume 13 outward of the opening 14. While the handle member 10 illustrated herein includes indentations 15 designed to accommodate fingers of a user, it should be understood within the scope of the present invention that the handle member 10 could be provided in alternate sizes and shapes and further be provided with or without indentations 15.

The animal treat dispenser 100 includes a gate valve member 20 that is present across opening 14 and is movable between a first position and a second position. The gate valve member 20 is planar in manner being manufactured from a rigid material such as but not limited to plastic. The gate valve member 20 is operable to hingedly move laterally away from the opening 14 when transitioned to its open position. The gate valve member 20 inhibits egression of any material disposed within the interior volume 13 into the dispensing member 45 in its closed position. Lever 21 provides an interface to operably engage the gate valve member 20 in order to move the gate valve member 20 between its open and closed positions. It should be understood within the scope of the present invention that the gate valve member 20 could be constructed in alternate manners and achieve the desired objective discussed herein. Furthermore, it should be understood within the scope of the present invention that the movement of the gate valve member between its open and closed position could be executed in alternate techniques.

The opening 14 is configured to have a plurality of dispensing members 30 operably coupled thereto. All embodiments of the dispensing members 30 are configured to receive material from the interior volume 13 of the handle member 10 and facilitate delivery to an animal. The embodiments of the dispensing members 30 illustrated herein are configured to receive and dispense solid and semi-solid materials. Dispensing member 35 is configured to dispense either a solid or semi-solid material. Dispensing member 35 includes a first portion 36 that is operably coupled to the handle member 10 and a second portion 37 contiguously formed therewith. Second portion 37 is scoop shaped, similarly to a spoon, wherein the shape of the second portion 37 is configured to receive and store material therein and make accessible for an animal. It should be understood within the scope of the present invention that the dispensing member 35 could be manufactured from silicone rubber or other durable material. Dispensing member 35 has operably coupled to the bottom thereof the gate valve member 20 which operates as discussed herein to control materials being deposited into the dispensing member 35.

Figures 2, 3:
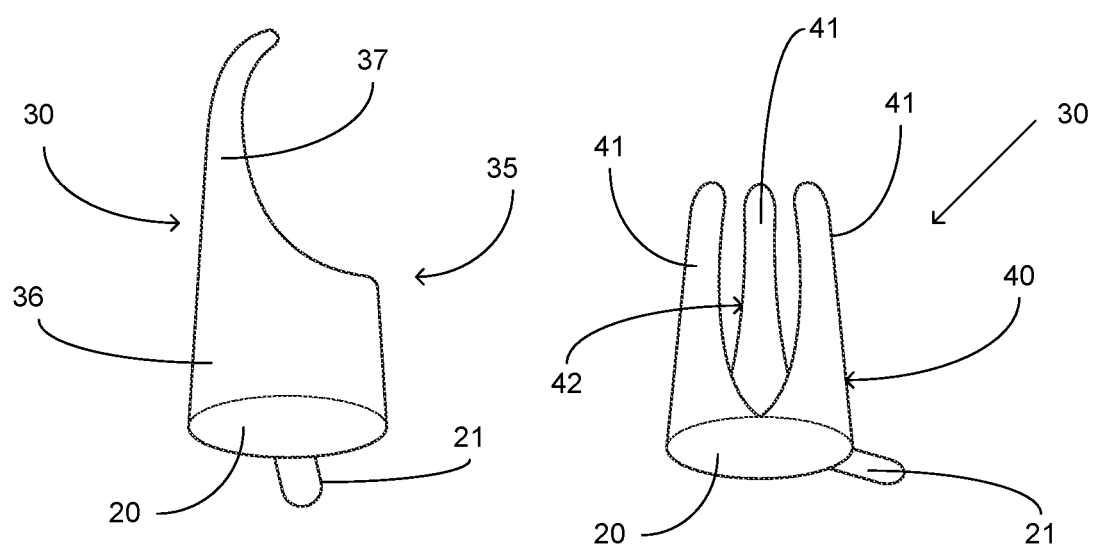
FIG. 2 is a side view of an embodiment of a dispensing member of the present invention.
FIG. 3 is a side view of an alternate embodiment of a dispensing member of the present invention.
Figure 4:
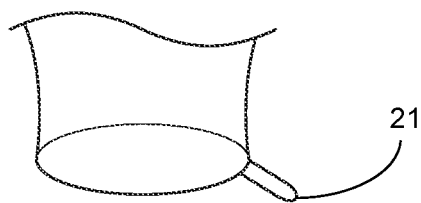
FIG. 4 is a detailed view of the gate valve of the present invention in a closed position.
Figure 5:
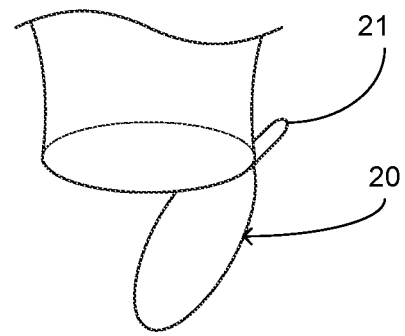
FIG. 5 is a detailed view of the gate valve of the present invention in an open position.
Figure 6:
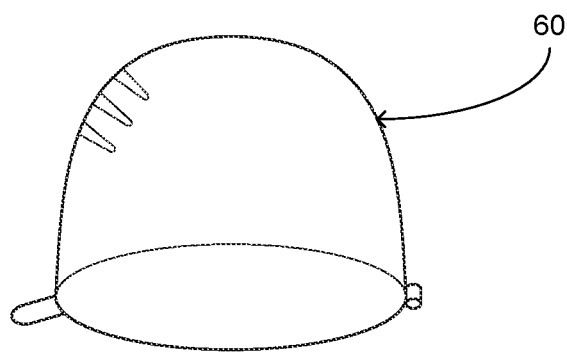
FIG. 6 is a detailed view of a lid embodiment of the present invention.

FIG. 3 submitted herewith illustrates an alternate embodiment of the dispensing member 40. Dispensing member 40 is operably coupled to handle member 10 over the opening 14. The dispensing member 40 includes finger-like projections 41 that are configured to create void 42 wherein void 42 is operable to retain therein a food material for delivery to an animal. The projections 41 are manufactured from a pliable material such as but not limited to silicone rubber in order to allow manipulation thereof by an animal providing access to food material present in the void 42. While three projections 41 are illustrated herein, it should be understood within the scope of the present invention that the dispensing member 40 could be provided with more or less than three projections 41. Gate valve member 20 is operably coupled to the dispensing member 40 and is configured to provide control of material being deposited into the dispensing member 40 as has been discussed herein.

Figure 7:
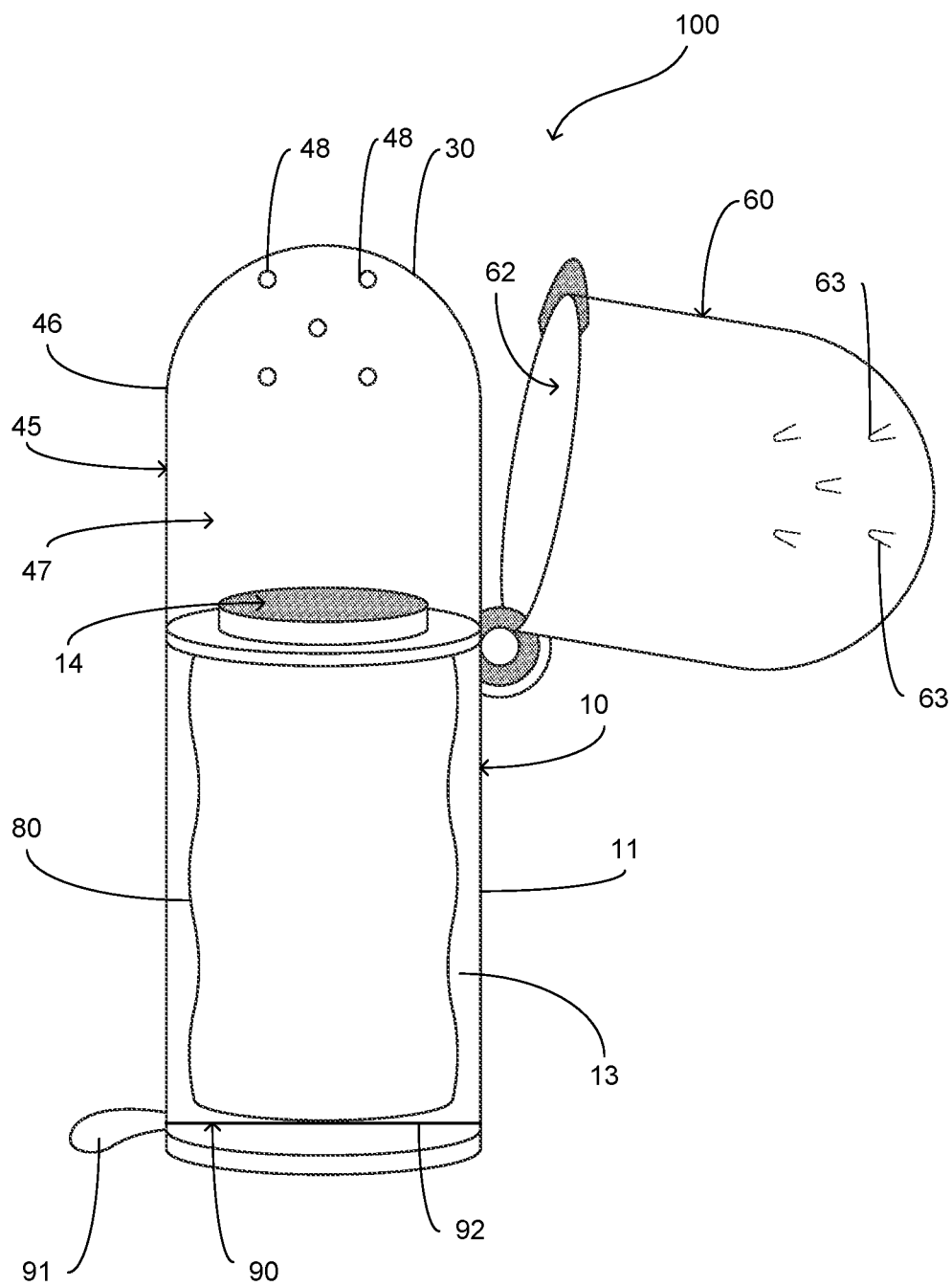
FIG. 7 is a perspective view of an embodiment of the present invention.

FIG. 7 submitted herewith illustrates yet another alternate embodiment of the dispensing member 45. Dispensing member 45 is illustrated herein as dome shaped but it should be understood within that scope of the invention that alternate shapes are contemplated. Dispensing member 45 is manufactured from a pliable material such as but not limited to silicone rubber. The dispensing member 45 includes wall 46 forming cavity 47 wherein cavity 47 is configured to receive material therein from bladder member 80. The wall 46 of the dispensing member 45 includes a plurality of apertures 48 proximate the top of the dispensing member 45. Apertures 48 are configured to have material egress therefrom ensuing pressure being applied to the wall 46 by an animal. It should be understood within the scope of the present invention that the wall 46 could be provided with alternate quantities of apertures 48. Furthermore, it should be understood within the scope of the present invention that the apertures 48 could be provided in alternate shapes and sizes in order to facilitate egression of food material therethrough. It should be additionally understood within the scope of the present invention that the apertures 48 could be configured with one-way valves in order to control egression of material therethrough.

Lid member 60 is hingedly secured to the handle member 10 utilizing suitable durable techniques. Lid member 60 is manufactured from a rigid material such as but not limited to plastic and is formed in a dome-like shape. The body of the lid member 60 forms the interior cavity 62 that is of suitable size to accommodate dispensing member 30 therein. Projection members 63 are formed on the inner surface of the wall 61 proximate the top of the lid member 60.

Projection members 63 are manufactured from a rigid material such as but not limited to plastic and are arranged in an identical pattern as the apertures 48. When the lid member 60 is moved to its closed position, the projection members 63 extend inward into the apertures 48 so as to clear any material potentially lodged therein. It should be understood within the scope of the present invention that the projection members 63 are provided in mateable size and shape as the apertures 48 so as to mateably engage therewith.

The animal treat dispenser 100 can be provided with a bladder member 80 wherein the bladder member 80 is configured to retain food material therein and provide a method of filling and refilling the animal treat dispenser 100 with food material. The bladder member 80 is manufactured from a suitable material such as but not limited to silicone rubber and is configured to be releasably secured within the interior volume 13 of the handle member 10. Pressure on the wall 11 could be applied to cause transfer of material from the bladder member 80 into the dispensing member 45. Additionally, it is contemplated within the scope of the present invention that a lever member 90 could be movably coupled to the handle member 10 wherein lever member 90 is operable to facilitate egression of material outwards from the bladder member 80. Lever member 90 includes first portion 91 that is slidably mounted to the handle member 10 and operable to be moved in an upwards-downwards manner. Second portion 92 is disposed within the interior volume 13 of the handle member 10 below the bladder member 80. A user of the animal treat dispenser 100 can move the lever member 90 in an upwards direction which will apply pressure to the bottom of the bladder member 80 and facilitate transfer of material disposed within the bladder member 80 into the dispensing member 45.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An animal treat dispenser configured to provide delivery of treats for an animal that are either semi-solid or solid wherein the animal treat dispenser comprises:
    a handle member, said handle member having at least one wall and a bottom forming a hollow interior volume, said handle member having a top end and a bottom end, said handle member having an opening proximate said top end;
    a dispensing member, said dispensing member being operably coupled to said handle member at said top end thereof, said dispensing member configured to receive food material from said handle, said dispensing member configured to receive solid and semi-solid food material;
    a gate valve, said gate valve being present between said handle member and said dispensing member, said gate valve being movable between an open and a closed position, wherein in said open position food material disposed in the interior volume of said handle member can be transferred into said dispensing member;
    a bladder member, said bladder member being disposed in said interior volume of said handle member, said bladder member having a wall creating an interior volume, said bladder member configured to be collapsible; and
    a lever member, said lever member being movably mounted within said interior volume of said handle member, said lever member having a portion thereof beneath said bladder member, said lever member operable to be moved upwards so as to collapse said bladder member and transfer food material from said bladder member into said dispensing member.

2. The animal treat dispenser configured to provide delivery of treats for an animal that are either semi-solid or solid as recited in claim 1, wherein said dispensing member includes a plurality of finger-like projections extending outward from a bottom portion thereof, said finger-like projections creating a void configured to receive a solid food material.

3. The animal treat dispenser configured to provide delivery of treats for an animal that are either semi-solid or solid as recited in claim 1, wherein said handle is manufactured from material that is configured to compress with pressure so as to move food material disposed therein from the interior volume of the handle to the dispensing member.

4. The animal treat dispenser configured to provide delivery of treats for an animal that are either semi-solid or solid as recited in claim 1, wherein said dispensing member includes a first portion and a second portion, said second portion being scoop shaped so as to receive a food material therein.

5. The animal treat dispenser configured to provide delivery of treats for an animal that are either semi-solid or solid as recited in claim 1, wherein said dispensing member further includes a wall, said wall defining an interior volume, said wall having a plurality of apertures proximate a top end thereof.

6. The animal treat dispenser configured to provide delivery of treats for an animal that are either semi-solid or solid as recited in claim 5, and further including a lid member, said lid member being hingedly secured to said handle member, said lid member configured to cover said dispensing member in a closed position of said lid member.

7. An animal treat dispenser configured to provide delivery of treats for an animal that are either semi-solid or solid wherein the animal treat dispenser comprises:
    a handle member, said handle member having a wall and a bottom forming a hollow interior volume, said handle member having a top end and a bottom end, said handle member having an opening proximate said top end, said wall of said handle member having indentations formed therein configured to accommodate human fingers;
    a dispensing member, said dispensing member being operably coupled to said handle member at said top end thereof, said dispensing member configured to receive food material from said handle, said dispensing member configured to receive solid and semi-solid food material;
    a gate valve, said gate valve being present between said handle member and said dispensing member, said gate valve being movable between an open and a closed position, wherein in said open position food material disposed in the interior volume of said handle member can be transferred into said dispensing member; and a lever member, said lever member having a first portion and a second portion, said second portion of said lever member being disposed within said interior volume of said handle, said first portion being located adjacent said wall of said handle member, said lever member being movably on said handle member, said lever member operable to be moved upwards so as to transfer food material from into said dispensing member.

8. The animal treat dispenser configured to provide delivery of treats for an animal that are either semi-solid or solid as recited in claim 7, and further including a bladder member, said bladder member being disposed in said interior volume of said handle member, said bladder member having a wall creating an interior volume, said bladder member configured to be collapsible upon movement of said lever member in an upwards direction so as to dispense food material into said dispensing member.

9. The animal treat dispenser configured to provide delivery of treats for an animal that are either semi-solid or solid as recited in claim 8, wherein said dispensing member further includes a wall, said wall defining an interior volume, said dispensing member having an interior volume configured to received food material from said bladder member, said wall having a plurality of apertures proximate a top end thereof.

10. The animal treat dispenser configured to provide delivery of treats for an animal that are either semi-solid or solid as recited in claim 9, and further including a lid member, said lid member being hingedly secured to said handle member, said lid member configured to cover said dispensing member in a closed position of said lid member, said lid member further having projection members formed on an inner surface thereof, said projection members configured to journal into said plurality of apertures when said lid member is in said closed position.

11. The animal treat dispenser configured to provide delivery of treats for an animal that are either semi-solid or solid as recited in claim 7, wherein said dispensing member includes a first portion and a second portion, said second portion being scoop shaped so as to receive a food material therein.

12. The animal treat dispenser configured to provide delivery of treats for an animal that are either semi-solid or solid as recited in claim 7, wherein said dispensing member includes a plurality of finger-like projections extending outward from a bottom portion thereof, said finger-like projections creating a void configured to receive a solid food material.

* * * * *